(12) United States Patent
Galvagni et al.

(10) Patent No.: US 7,832,618 B2
(45) Date of Patent: Nov. 16, 2010

(54) TERMINATION BONDING

(75) Inventors: John L. Galvagni, Surfside Beach, SC (US); Thomas J. Brown, Myrtle Beach, SC (US)

(73) Assignee: AVX Corporation, Myrtle Beach, SC (US)

( * ) Notice: Subject to any disclaimer, the term of this patent is extended or adjusted under 35 U.S.C. 154(b) by 262 days.

(21) Appl. No.: 11/972,074

(22) Filed: Jan. 10, 2008

(65) Prior Publication Data

US 2008/0179382 A1 Jul. 31, 2008

Related U.S. Application Data

(60) Provisional application No. 60/898,507, filed on Jan. 31, 2007.

(51) Int. Cl.
*B23K 31/02* (2006.01)
(52) U.S. Cl. .................. 228/180.21; 228/248.1
(58) Field of Classification Search ........................ None
See application file for complete search history.

(56) References Cited

U.S. PATENT DOCUMENTS

| | | | |
|---|---|---|---|
| 4,353,153 A | 10/1982 | Prakash | |
| 4,517,155 A | 5/1985 | Prakash et al. | |
| 4,953,273 A | 9/1990 | Insetta et al. | |
| 5,006,953 A | 4/1991 | Hirama et al. | |
| 5,532,910 A * | 7/1996 | Suzuki et al. | 361/813 |
| 5,618,470 A * | 4/1997 | Yamana | 252/512 |
| 5,661,882 A | 9/1997 | Alexander | |
| 6,047,876 A * | 4/2000 | Smith | 228/111.5 |
| 6,188,052 B1 * | 2/2001 | Trucco | 219/603 |
| 6,470,545 B1 | 10/2002 | Branchevsky | |
| 2005/0179121 A1 * | 8/2005 | Tanaka et al. | 257/666 |
| 2006/0255476 A1 * | 11/2006 | Kuhlman et al. | 257/782 |
| 2008/0106852 A1 * | 5/2008 | Amita et al. | 361/528 |
| 2009/0034155 A1 * | 2/2009 | Devoe | 361/306.3 |
| 2009/0034163 A1 * | 2/2009 | Kabe et al. | 361/528 |
| 2009/0135551 A1 * | 5/2009 | Nemoto et al. | 361/535 |
| 2009/0168304 A1 * | 7/2009 | Saito et al. | 361/524 |
| 2009/0237865 A1 * | 9/2009 | Komazawa et al. | 361/528 |
| 2009/0241311 A2 * | 10/2009 | Naito et al. | 29/25.03 |
| 2009/0303665 A1 * | 12/2009 | Oohata | 361/527 |

FOREIGN PATENT DOCUMENTS

| | | |
|---|---|---|
| EP | 1443530 A1 | 8/2004 |
| GB | 2272433 A | 5/1994 |
| JP | 405308115 A * | 11/1993 |
| JP | 10189623 A * | 7/1998 |

OTHER PUBLICATIONS

Search Report from British Patent Applicetion No. GB0801345.0 dated Apr. 22, 2008.

* cited by examiner

*Primary Examiner*—Kiley Stoner
(74) *Attorney, Agent, or Firm*—Dority & Manning, P.A.

(57) ABSTRACT

Disclosed are methodologies for producing lead type electrical components. Components are placed in a lead frame with termination paste applied to selected portions of the component. Upon firing of the assembled lead frame and electrical components, the electrical components are concurrently terminated, and provided with strongly secured leads.

25 Claims, 3 Drawing Sheets

TERMINATION BONDING

PRIORITY CLAIM

This application claims the benefit of previously filed U.S. Provisional Patent Application entitled "TERMINATION BONDING," assigned U.S. Ser. No. 60/898,507, filed Jan. 31, 2007, and which is incorporated herein by reference for all purposes.

FIELD OF THE INVENTION

The present subject matter relates to termination methodologies for electronic components. In particular the present subject matter relates to termination methodologies for multilayer capacitors (MLC).

BACKGROUND OF THE INVENTION

Multilayer capacitors have traditionally been produced in various configurations including both lead type chips and leadless chips. Leadless chips may be provided with end terminations configured for direct attachment to, for example, printed wiring boards. Lead type chips may be provided with a lead or connection tabs secured to the capacitor chip to provide additional mounting options.

Traditionally lead type chips have been produced by first producing a completed capacitor chip and then securing such completed chip to a lead or tab. Such securing most commonly has been accomplished by soldering the capacitor chip to a lead or tab with relatively low melting point solder.

In some instances, a solder preform or paste may have been applied to termination points on respective ends of an otherwise completed capacitor chip and the chip with the solder in place has been placed in a lead frame configured for reception of a plurality of capacitor chips. Once all chips are placed in the lead frame, the assembly may then be subjected to a heat cycle at appropriate temperatures to re-flow the solder-and secure the chip to the lead frame. Subsequent processing separates the individual chips by severing selected portions of the lead frame to produce a final product.

Because the various solders used in such known process have relatively low melting points, problems may arise if the final product is to be used in environments involving extreme temperatures, especially with recently mandated switch to lead-free solders. In addition to the above noted concerns, production of finished products of such type requires a relatively large number of production steps resulting in significant manufacturing costs.

Various patents have related to firing of capacitor material and/or the application of terminations and/or leads to capacitor material, such as, for example, U.S. Pat. No. 6,470,545 B1 to Branchevsky and entitled "Method of Making an Embedded Green Multi-Layer Ceramic Chip Capacitor in a Low-Temperature Co-Fired Ceramic (LTCC) Substrate"; U.S. Pat. No. 5,661,882 to Alexander and entitled "Method of Integrating Electronic Components into Electronic Circuit Structures Made Using LTCC Tape"; U.S. Pat. No. 5,006,953 to Hirama et al. and entitled "Lead Type Chip Capacitor and Process for Producing the Same"; U.S. Pat. No. 4,953,273 to Insetta et al. and entitled "Process for Applying Conductive Terminations to Ceramic components"; and U.S. Pat. No. 4,353,153 to Prakash and entitled "Method of Making Capacitor with Co-Fired End Terminations."

The disclosures of all of the foregoing citations are fully incorporated herein by reference, for all purposes.

In light of such presently recognized aspects of prior methodologies and arrangements, it would be desirable to provide a methodology to produce lead type chip capacitors that significantly reduces the production steps required while at the same time producing components that may be employed in relatively higher temperature environments.

While various implementations for the production of lead type electronic components have been developed, no design has emerged that generally encompasses all of the desired characteristics as hereafter presented in accordance with the present subject matter.

SUMMARY OF THE INVENTION

In view of the recognized features encountered in the prior art and addressed by the present subject matter, improved methodologies for producing lead type electronic components have been developed.

In an exemplary configuration, a partially completed component is mounted to a lead frame so that the manufacture of the component is completed concurrently with attachment of leads to the component.

In one of their simpler forms, partially completed capacitors are provided with a conductive paste termination material and placed in a preformed lead frame for lead attachment.

Another positive aspect of this type of manufacturing technology is that overall manufacturing steps may be significantly reduced.

In accordance with aspects of certain embodiments of the present subject matter, methodologies are provided to provide electrical components that may be operated in significantly higher temperature environments than previously available.

One exemplary present method relates to improved termination bonding methodology for producing lead type electrical components. Preferably, such methodology may comprise placing at least one electrical component in a lead frame with termination paste applied to selected portions of such component; and subsequently firing the assembled lead frame and at least one electrical component, so that such electrical component is terminated while leads of the lead frame are secured thereto.

One exemplary variation of the foregoing methodology may include further providing a plurality of such electrical components placed in the lead frame, all with such termination paste applied to selected portions thereof. With such approach, preferably such plurality of electrical components are concurrently terminated during subsequent firing thereof, while leads of the lead frame are secured thereto.

In still further present variations of the foregoing presently improved termination bonding methodology, the electrical component or components thereof may comprise one of a multilayer capacitor, or one of resistive and inductive components.

Yet another present exemplary embodiment of the present termination methodology for multilayer capacitors having leads may preferably comprise providing a plurality of unterminated multilayer capacitors; selectively applying termination paste to such unterminated multilayer capacitors; controllably drying such unterminated multilayer capacitors with applied termination paste so that such termination paste is dried but not fired; providing a metal lead frame having respective nested locations for respective of such plurality of unterminated multilayer capacitors; situating such plurality of termination paste dried multilayer capacitors in the respective nested areas thereof provided by such metal lead frame; and firing such combined plurality of multilayer capacitors and the metal lead frame, so as to simultaneously provide termination and lead bonding for the plurality of multilayer capacitors.

Still another present exemplary embodiment of the present subject matter relates to a method for producing lead type chip capacitors using a relatively reduced number of production steps but resulting with relatively higher temperature environment tolerance components. Such method may preferably comprise providing a pre-formed lead frame for lead attachment with a plurality of respective defined component receiving areas; providing a respective plurality of partially completed capacitor components; applying conductive paste termination material to such plurality of partially completed capacitor components; placing such respective plurality of partially completed capacitor components with conductive paste termination material applied thereto into such respective defined component receiving areas of such lead frame; and firing such combined components and lead frame so as to concurrently terminate such components while attaching leads thereto.

Additional present variations may be practiced for such exemplary method for producing lead type chip capacitors by further practicing additional aspects, such as providing unterminated multilayer capacitors as such partially completed capacitor components; applying such conductive paste termination material to respective end portions of each of such plurality of partially completed capacitor components; separating selected portions of such fired combined components and lead frame so as to form a respective plurality of terminated, lead type capacitor components; selectively plating such plurality of terminated, lead type capacitor components; selectively molding such plurality of plated, terminated, lead type capacitor components so as to form protective molded material around the body of each such lead type capacitor component with leads thereof respectively protruding from such molded material; and selectively forming leads of such plurality of plated, terminated, lead type capacitor components into preselected configurations, for mounting to a printed wiring board or other selected support structure.

Additional objects and advantages of the present subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments and uses of the present subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the present subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the present subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

Figures 1A, 1B:
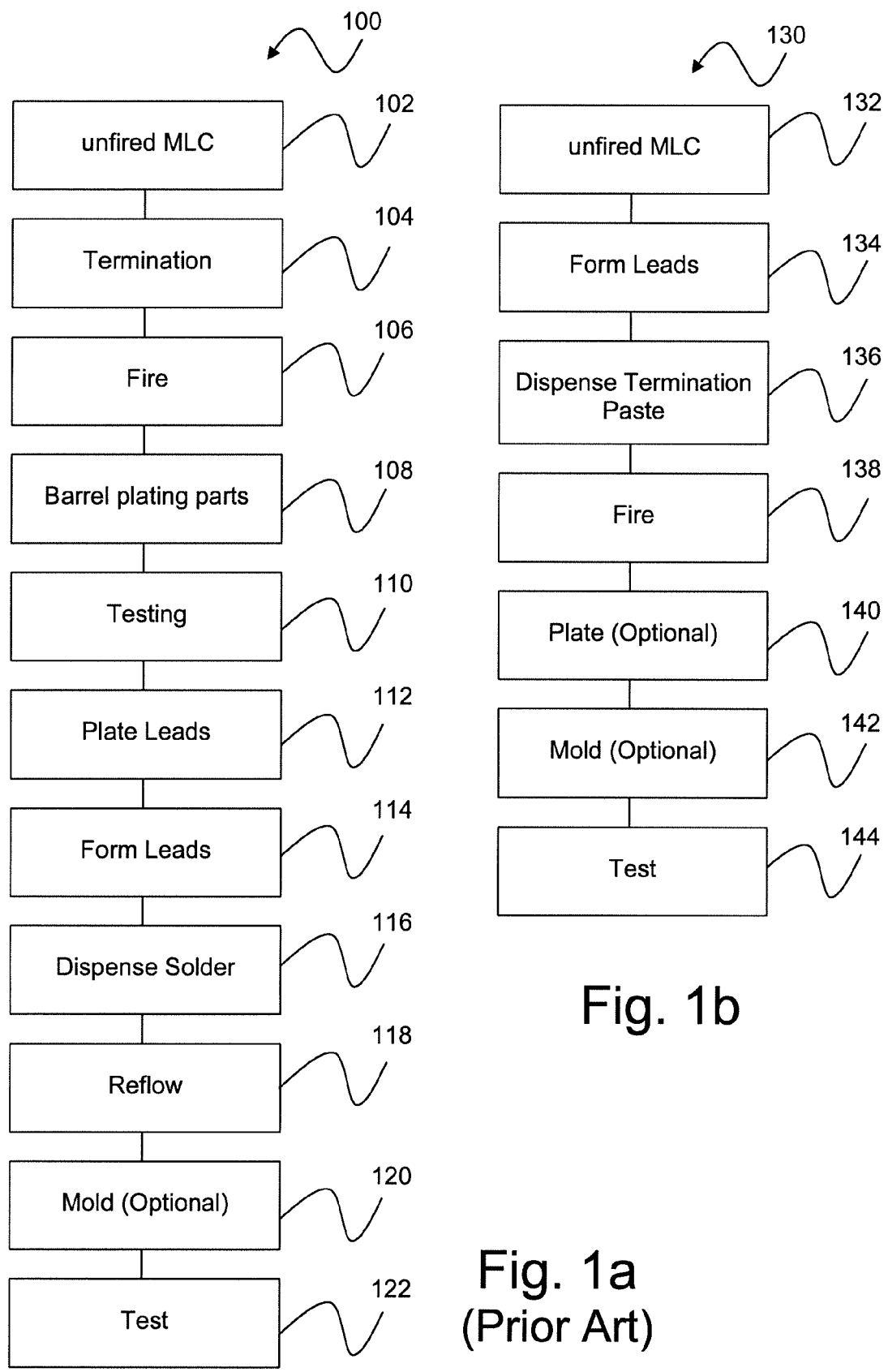
FIGS. 1a and 1b represent, respectively, comparisons between a currently practiced production methodology and a production methodology in accordance with the present subject matter.

Repeat use of reference characters throughout the present specification and appended drawings is intended to represent same or analogous features, elements, or steps of the present subject matter.

DETAILED DESCRIPTION OF THE PREFERRED EMBODIMENTS

As discussed in the Summary of the Invention section, the present subject matter is particularly concerned with improved methodologies for producing lead type electronic components.

Selected combinations of aspects of the disclosed subject matter correspond to a plurality of different embodiments of the present subject matter. It should be noted that each of the exemplary embodiments presented and discussed herein should not insinuate limitations of the present subject matter. Features or steps illustrated or described as part of one embodiment may be used in combination with aspects of another embodiment to yield yet further embodiments. Additionally, certain features may be interchanged with similar devices or features not expressly mentioned which perform the same or similar function.

Reference will herein be made in detail to presently preferred exemplary embodiments of the present termination bonding subject matter. Referring to the drawings, FIGS. 1a and 1b represent, respectively, comparisons between a currently practiced production methodology and a production methodology in accordance with the present subject matter.

Referring more specifically to FIG. 1a, it will be observed that currently known technology for producing a lead type capacitor component requires a significant number of manufacturing steps, thus contributing significantly to the cost of manufacturing while still producing a product incapable of high levels of performance commonly currently required or desired with respect to thermal environmental operations.

In accordance with the currently known (Prior Art) manufacturing process (collective steps practiced together) generally 100 as illustrated in FIG. 1*a*, a first step 102 is performed to produce an unterminated multilayered ceramic component. The component is then terminated at step 104 through application of, for example, a metal/glass/organic paste coating applied to selected portions of the unfired component. The coating is applied in order to connect selected conductive layers internal of the electronic component.

Following termination step 104, the terminated components are fired at step 106. Fired components are barrel plated in step 108 in order to provide selected coating materials to the termination portions of the fired components. The particular plating materials may include various metals useful to address specific concerns related to the particular environments in which the finished products may be employed as well as to provide a more solder compatible coating layer to enhance later manufacturing steps.

Following barrel plating step 108, the components are tested as indicated at step 110. Those components that are considered to be "good," A, that pass testing step 110, may be further processed to provide lead attachment. Leads may be attached to the tested components by first providing a plated lead frame in step 112, after which the leads are formed to proper shape in step 114. Solder may be dispensed at step 116 by application to the fired and tested components. The thus prepared components may then be inserted into the plated lead frame for yet further processing.

Final processing steps of the Prior Art methodology generally 100 begin with reflow step 118 where the lead frame housed, fired, and terminated chips are reheated to cause the dispensed solder to reflow and to secure the lead frame and components together. Finally, per the collective steps constituting the process 100, the soldered components are sometimes molded with a protective coating at step 120. In some instances, the parts are provided without further encapsulation. In either case, they are then tested at testing step 122 in order to produce finished components in accordance with prior art methodology generally 100.

With reference to FIG. 1*b*, a process 130 in accordance with the present subject matter will be described. As may be seen from a comparison and contrasting of FIGS. 1*a* and 1*b*, the different steps and methodology of the present subject matter requires significantly fewer manufacturing steps, yet produces a significantly improved final component.

It should be noted at this juncture and understood by those of ordinary skill in the art that while the major portion of the present disclosure describes production of a lead type multilayer capacitor, other types of electronic components may be produced through use of the presently disclosed methodology. For example, resistive and/or inductive components may be produced, and/or other forms of capacitive components may be produced through use of the present subject matter.

With further reference to FIG. 1*b*, it will be noted that process 130 in accordance with the present subject matter starts with production of an unterminated multilayer capacitor at step 132 in substantially the same manner as process 100 at step 102. The methodology of the present subject matter immediately, however, thereafter deviates from the known process by going directly to the provision at step 134 of a formed lead frame. Significantly, further in accordance with the present subject matter, termination paste is dispensed at step 136 and applied to selected portions of the multilayer capacitor component as the component is inserted into the provided lead frame. Placement of such components will be more readily seen with reference to FIG. 4 as described hereinbelow.

Following appropriate placement of the unterminated component in the lead frame and termination paste dispensing, the assembly is fired as illustrated at step 138 of the present methodology (FIG. 1*b*). Firing at such time and under such conditions achieves multiple purposes. First, the unterminated multilayer capacitor component is concurrently terminated and bonded to the leads, thus simultaneously obviating previously known steps 104, 108, 110, and 118 as illustrated in FIG. 1*a*.

Following firing step 138, the entire assembly may be plated at plating step 140, and then molded and tested at respective steps 142 and 144. It will be appreciated by those of ordinary skill in the art, that in some instances where precious metal frames are used, for example silver, the plating step 140 is not necessary. Even if it is required, it can be done following the molding process, 142.

Figure 2:
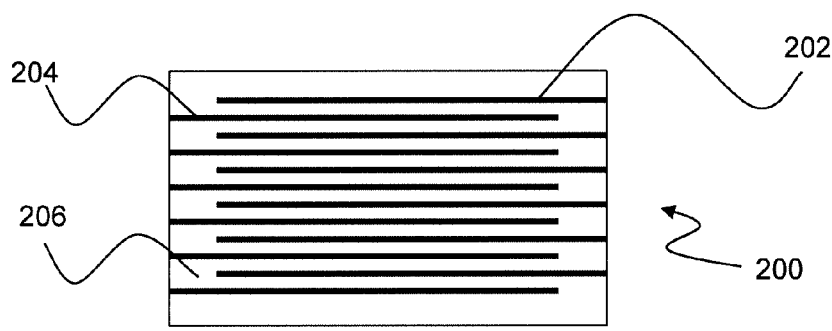
FIG. 2 illustrates in representative cross-section an exemplary partially manufactured multilayer capacitor (MLC) chip in accordance with present subject matter.

With reference to present FIG. 2, there is illustrated a representative cross-section of an exemplary partially manufactured multilayer capacitor (MLC) chip 200. As is known to those of ordinary skill in the art, MLC 200 may be constructed by alternately layering conductive layers 202, 204 between ceramic dielectric layers 206 so as to produce a stack of alternating conductive layers and insulating layers. Such layers may number from several layers to hundreds of layers, depending on the desired capacitance value. The stack of alternating conductive and dielectric layers may then be sintered so that a monolithic block is formed. Alternating conductive layers 202, 204 may be exposed at opposite ends of the stack so that they may subsequently be electrically connected together.

Figure 3:
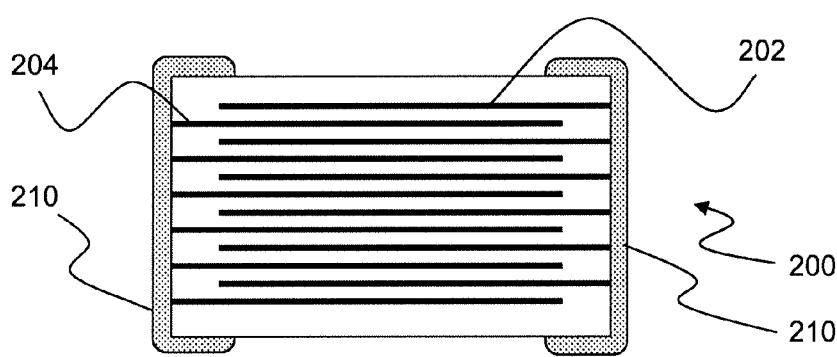
FIG. 3 illustrates in representative cross-section the capacitor chip of FIG. 2 with termination paste selectively applied to end portions thereof.

With reference to FIG. 3, there is illustrated a representative cross-section of a sintered, termination-dried, but not yet termination-fired MLC chip 200 as illustrated in FIG. 2, with termination paste 210 selectively applied to end portions thereof so as to connect alternating conductive layers 202, 204. Termination paste 210 may correspond to a copper (Cu) based paste that, when fired in accordance with the present subject matter, simultaneously provides termination of the unfired MLC and high temperature lead bonding.

Figure 4:
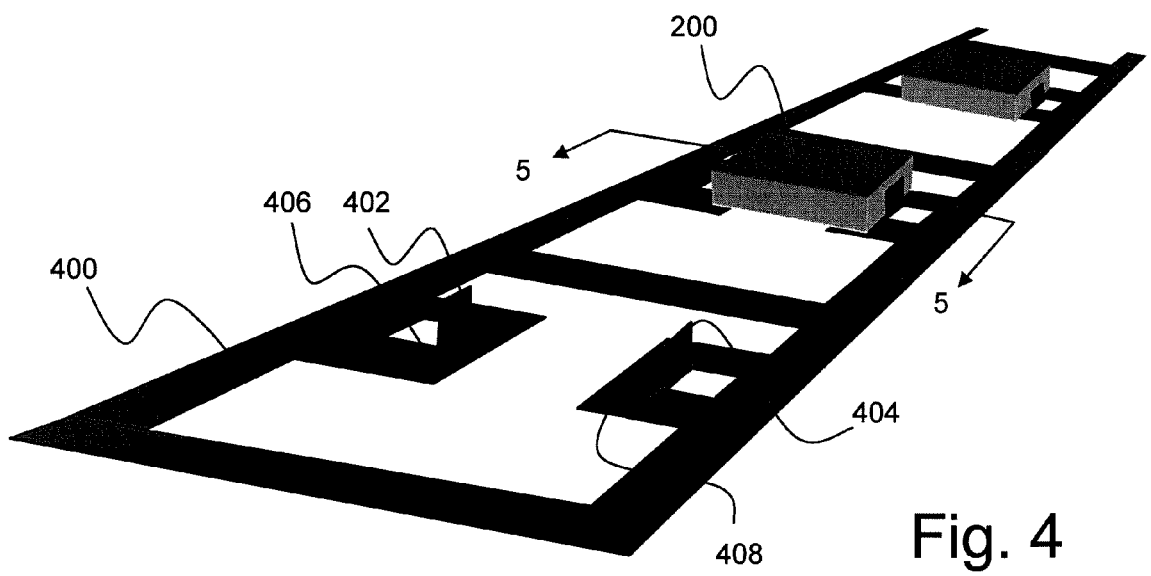
FIG. 4 illustrates a perspective view of a present exemplary lead frame in which partially completed components have been placed.

FIG. 4 illustrates a perspective view of a present exemplary lead frame in which partially completed components have been placed. With more particular reference to FIG. 4, there is illustrated a lead frame 400 in which partially completed components have been placed. As may be observed from FIG. 4, exemplary lead frame 400 corresponds to a metal frame in which have been provided mounting locations for electronic components. Such mounting locations include upstanding tabs 402, 404 and support portions 406, 408 between which and upon which exemplary components 202 may be positioned (as illustrated by such present FIG. 4).

Figure 5:
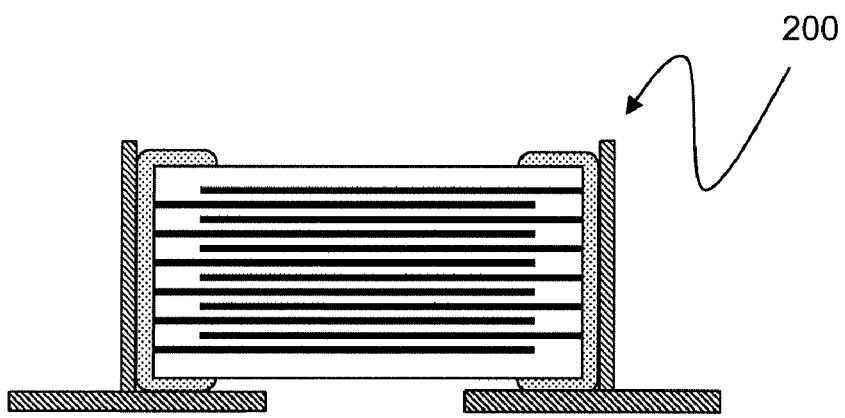
FIG. 5 illustrates a lateral cross-section of an exemplary fired component in accordance with present subject matter, taken along the section line 5-5 as illustrated in present FIG. 4.

With reference to FIG. 5, there is illustrated a lateral cross-section of a component, viewed along section line 5-5 of present FIG. 4. As may be seen, firing step 138 (FIG. 1*b*) of the present methodology will braze the lead frame 400 to chip 202 and simultaneously form a termination from termination paste 210.

Figure 6:
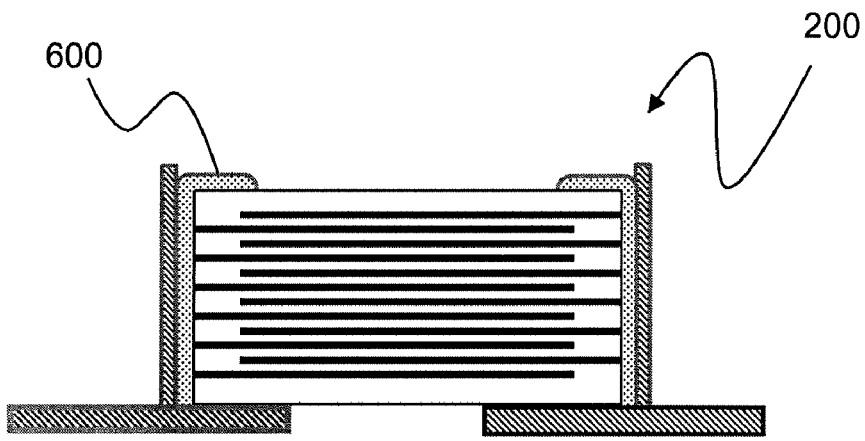
FIG. 6 illustrates a lateral cross-section of the results of a plating process in accordance with the present subject matter, as applied for example to the exemplary embodiment of present FIG. 5.

FIG. 6 illustrates a lateral cross-section of the results of a plating process in accordance with the present subject matter, as applied for example to the exemplary embodiment of present FIG. 5. With reference to such FIG. 6, following firing step 138, lead frame 400 and components 202 may be plated. In an exemplary embodiment, the present subject matter may correspond to a lead frame corresponding to a ribbon like continuous reel of metallic-formed material upon which chips 202 have been mounted and termination-fired. The continuous strip is generally wound into a reel for transporting and further processing. The entire reel may be plated with a layer 600 of nickel and tin or other appropriate material and then molded with protective material 700 (FIG. 7).

Figure 7:
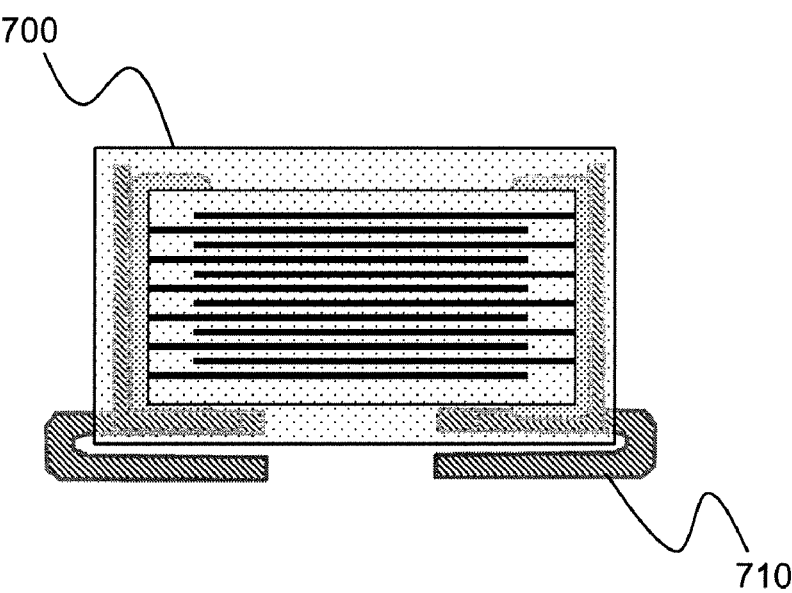
FIG. 7 illustrates a lateral cross-section of a completed electrical component manufactured in accordance with the present subject matter.

FIG. 7 illustrates a lateral cross-section of a completed electrical component manufactured in accordance with the present subject matter. With further reference to FIG. 7, it will be seen that the final covering of protective material 700 may be applied, and the finished electrical components may be cut from the lead frame, and the attached leads 710 may be formed to an appropriate configuration for mounting to a printed wiring board or other support structure.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. Improved termination bonding methodology for producing lead type electrical components, such methodology comprising:
   placing at least one electrical component in a lead frame with termination paste applied to selected portions of such component;
   drying such applied termination paste; and
   subsequently firing the assembled lead frame and at least one electrical component, so that such electrical component is terminated while leads of the lead frame are secured thereto;
   wherein such electrical component comprises a partially manufactured multilayer capacitor, constructed of alternately layered conductive layers between ceramic dielectric layers so as to produce a stack of alternating conductive layers and insulating layers, and exposed at opposite ends of such stack so that they may subsequently be electrically connected together during the firing step.

2. Improved termination bonding methodology as in claim 1, wherein a plurality of such electrical components are placed in the lead frame, all with such termination paste applied to selected portions thereof, so that such plurality of electrical components are concurrently terminated during subsequent firing thereof, while leads of the lead frame are secured thereto.

3. Improved termination bonding methodology as in 1, wherein:
   a plurality of such electrical components are placed in the lead frame; and
   at least one of such electrical components comprises one of resistive and inductive components.

4. Improved termination bonding methodology as in claim 1, wherein such placing step includes applying such termination paste to selected portions of such component as such component is placed in a lead frame.

5. Improved termination bonding methodology as in claim 1, wherein:
   a plurality of such electrical components are placed in the lead frame; and
   at least one of such electrical components comprises an unterminated electrical component.

6. Improved termination bonding methodology as in claim 1, wherein such layers number in a range from four layers to hundreds of layers, depending on a desired capacitance value.

7. Improved termination bonding methodology as in claim 1, wherein such stack of alternating conductive and dielectric layers are sintered so as to form a monolithic block comprising such partially manufactured multilayer capacitor.

8. Improved termination bonding methodology as in claim 1, wherein such termination paste comprises a copper based paste, so as to provide termination and high temperature lead bonding of such electrical component when fired.

9. Improved termination bonding methodology as in claim 8, wherein such firing step brazes such lead frame to such component while simultaneously forming terminations for such component from such termination paste.

10. A method for producing lead type chip capacitors using a relatively reduced number of production steps but resulting with relatively higher temperature environment tolerance components, such method comprising:
    providing a pre-formed lead frame for lead attachment with a plurality of respective defined component receiving areas;
    providing a respective plurality of partially completed capacitor components;
    applying conductive paste termination material to such plurality of partially completed capacitor components;
    placing such respective plurality of partially completed capacitor components with conductive paste termination material applied thereto into such respective defined component receiving areas of such lead frame; and
    firing such combined components and lead frame so as to concurrently terminate such components while attaching leads thereto.

11. A method for producing lead type chip capacitors as in claim 10, wherein such partially completed capacitor components comprise unterminated multilayer capacitors.

12. A method for producing lead type chip capacitors as in claim 10, wherein such conductive paste termination material is applied to respective end portions of each of such plurality of partially completed capacitor components.

13. A method for producing lead type chip capacitors as in claim 10, further comprising separating selected portions of such fired combined components and lead frame so as to form a respective plurality of terminated, lead type capacitor components.

14. A method for producing lead type chip capacitors as in claim 13, further comprising selectively plating such plurality of terminated, lead type capacitor components.

15. A method for producing lead type chip capacitors as in claim 14, further comprising selectively molding such plurality of plated, terminated, lead type capacitor components so as to form protective molded material around the body of each such lead type capacitor component with leads thereof respectively protruding from such molded material.

16. A method for producing lead type chip capacitors as in claim 15, further comprising selectively forming leads of such plurality of plated, terminated, lead type capacitor components into preselected configurations, for mounting to a printed wiring board or other selected support structure.

17. A method for producing lead type chip capacitors as in claim 15, further comprising selectively testing respective of such plurality of plated, terminated, lead type capacitor components.

18. A method for producing lead type chip capacitors as in claim 13, further comprising selectively plating such lead frame and such plurality of terminated, lead type capacitor components.

19. A method for producing lead type chip capacitors as in claim 18, wherein such plating comprises one of nickel and tin.

20. A method for producing lead type chip capacitors as in claim 10, wherein such pre-formed lead frame comprises with such component receiving areas thereof formed by a corresponding plurality of upstanding tabs and support portions.

21. A method for producing lead type chip capacitors as in claim 10, wherein such lead frame comprises a ribbon like continuous reel of metallic-formed material, after firing of which components have been mounted thereon and termination-fired.

22. A method for producing lead type chip capacitors as in claim 21, wherein such continuous reel is wound onto a transport reel, to be transported for further processing.

23. A method for producing lead type chip capacitors as in claim 10, wherein:
   such partially completed capacitor components comprise unterminated multilayer capacitors; and
   such conductive paste termination material is applied to respective end portions of each of such plurality of partially completed capacitor components; and
   wherein such method further comprises separating selected portions of such fired combined components and lead frame so as to form a respective plurality of terminated, lead type capacitor components;
   selectively plating such plurality of terminated, lead type capacitor components;
   selectively molding such plurality of plated, terminated, lead type capacitor components so as to form protective molded material around the body of each such lead type capacitor component with leads thereof respectively protruding from such molded material; and
   selectively forming leads of such plurality of plated, terminated, lead type capacitor components into preselected configurations, for mounting to a printed wiring board or other selected support structure.

24. A method for producing lead type chip capacitors as in claim 21, wherein such ribbon like continuous reel of metallic-formed material comprises a precious metal.

25. A method for producing lead type chip capacitors as in claim 24, wherein such precious metal comprises silver.

* * * * *